L. P. BAUER.
STARCH PRODUCT AND METHOD OF MAKING SAME.
APPLICATION FILED JUNE 21, 1915.
1,175,114.
Patented Mar. 14, 1916.
2 SHEETS—SHEET 1.
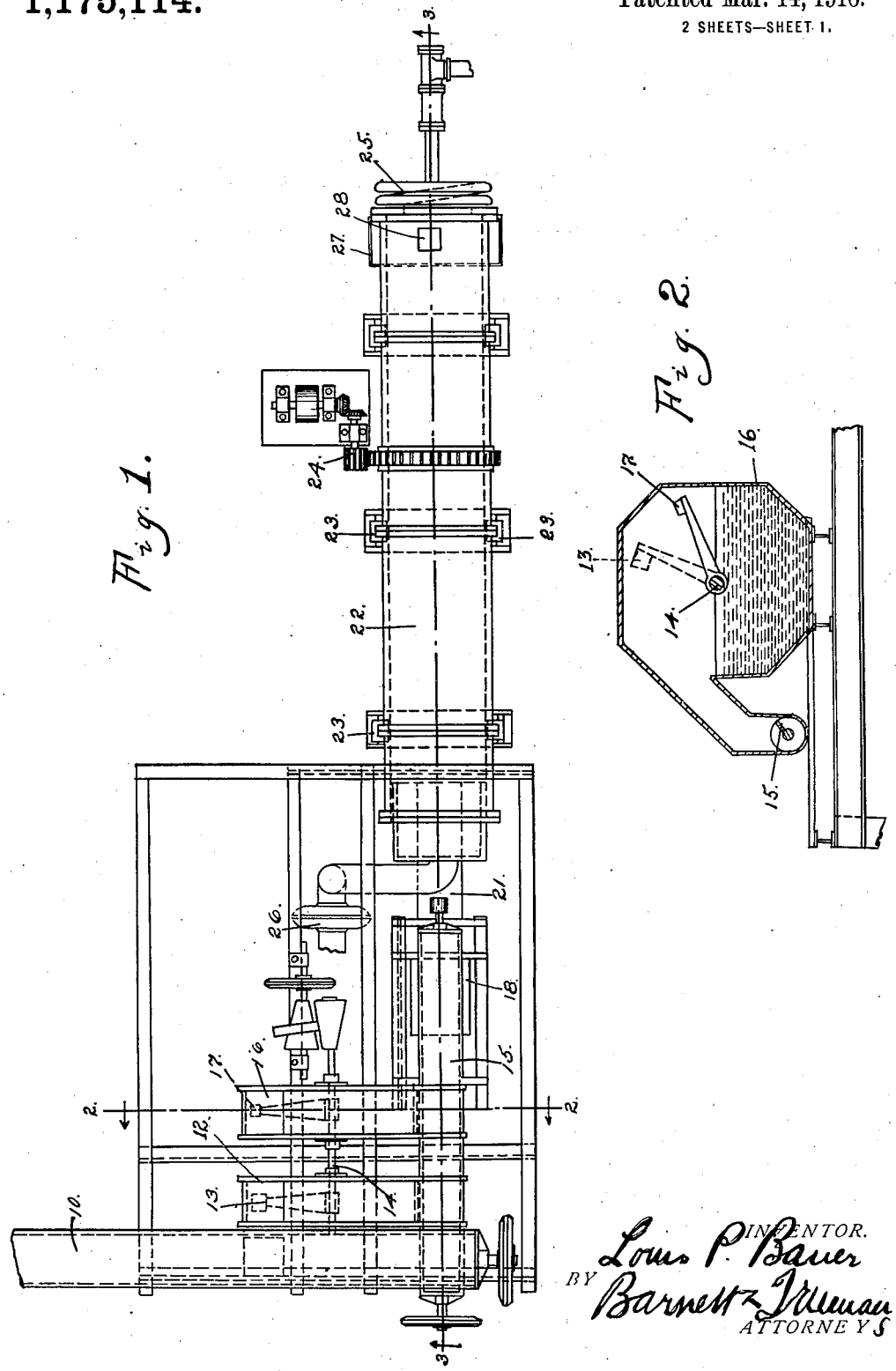

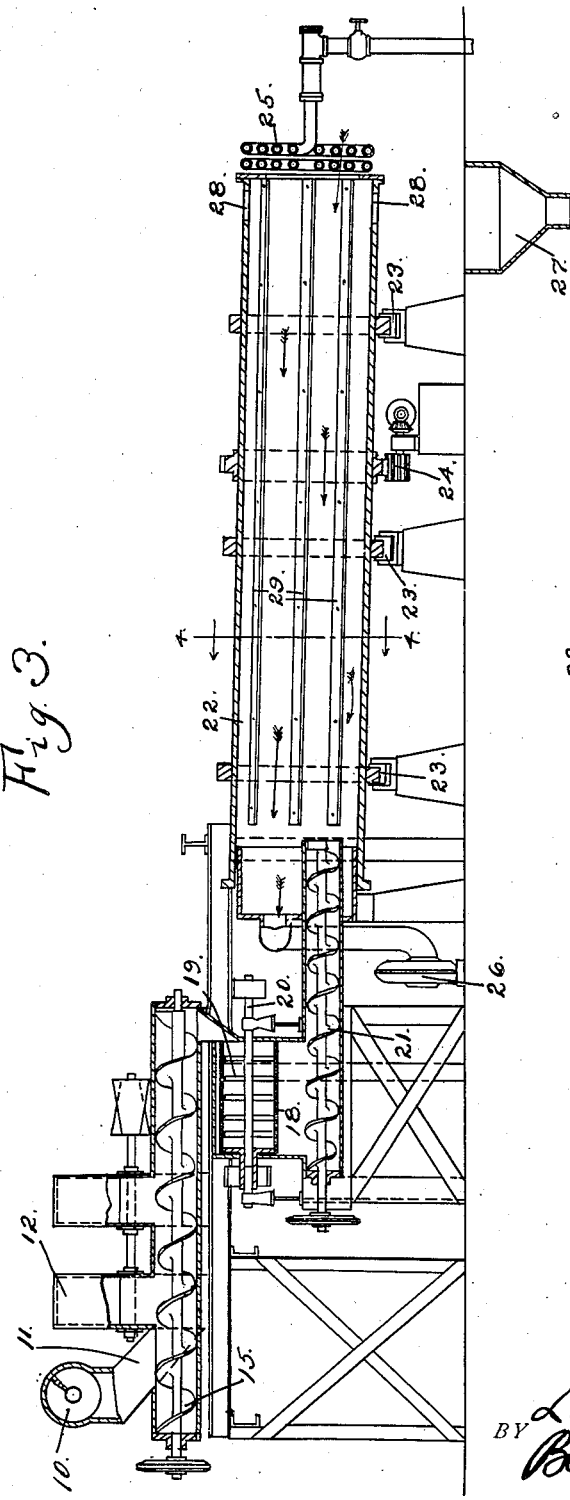
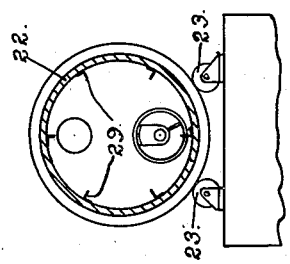

UNITED STATES PATENT OFFICE.

LOUIS P. BAUER, OF CHICAGO, ILLINOIS, ASSIGNOR TO CORN PRODUCTS REFINING COMPANY, A CORPORATION OF NEW JERSEY.

STARCH PRODUCT AND METHOD OF MAKING SAME.

1,175,114.   Specification of Letters Patent.   Patented Mar. 14, 1916.

Application filed June 21, 1915. Serial No. 35,335.

*To all whom it may concern:*

Be it known that I, LOUIS P. BAUER, a citizen of the United States, residing at Chicago, in the county of Cook and State of Illinois, have invented certain new and useful Improvements in Starch Products and Methods of Making Same, of which the following is a specification.

This invention has to do with the production of starch in the form of pellets or small lumps or particles in which the starch granules are held together by a binder of such character that the pellets or lumps will resist being reduced to powder by attrition but will nevertheless readily break down in water to form starch milk containing substantially no sediment or residue of any sort.

The principal object of the invention is to provide a granular starch product for use particularly in brewing or in other industries where analogous conditions prevail, which will be substantially dustless, will flow readily without clogging and will contain no unconvertible or pasted starch, or practically none, so that it may be used to advantage as a substitute for pearl starch, corn grits, rice or other starchy material employed in brewing or in other similar arts.

The use of ordinary starch in brewing, although desirable because of its low cost, has several objectionable features. Being to a large extent in the form of an impalpable powder, it is not readily conveyed from the starch bins to the mashing tanks but tends to clog and stick in the chutes, elevators or other apparatus or devices with which it comes in contact. A further objection is that it is likely, in handling and transportation, to fill the air with finely powdered starch which settles on the floors and apparatus of the brewery and ferments and produces a disagreeable odor. The use of corn grits and rice is not attended with these disadvantages. Rice, however, and corn grits contain a great deal of useless matter, namely, the glutenous and fibrous constituents of the corn and rice, together with some oil which ordinarily is likely to taint the beer.

The product which I have devised has all the advantages of granular products, such as rice and corn grits, together with those possessed by ordinary starch. It has none of the disadvantages of any of these materials. It is dustless. The pellets or particles are hard enough so they are not reduced to powder to any considerable extent by attrition and pressure in transportation and handling. It will flow as readily as rice or corn grits. Furthermore, it contains no unconvertible starch or other ingredient likely to leave a sediment or residue in the mash. This is a matter of the highest importance in connection with the use of the product for brewing. Any appreciable amount of gelatinized starch will make the product wholly unsuitable for use in this connection. When gelatinized starch cools, it becomes hard and horn-like and is practically insoluble in hot or cold water. If starch is used in the mash which is partially gelatinized or contains gelatinized lumps or particles, the gelatinized or partially gelatinized particles do not break down and form a starch milk even at the relatively high temperatures used in mashing. Gelatinized starch is so extremely tough and insoluble that if a lump of raw starch is superficially gelatinized even very slightly, the gelatinized envelop or film prevents the raw starch granules within the lump from being freed in the mash and subjected to the intended conversion into maltose by the diastatic action of the malt.

My invention provides a process of producing starch in the form of dry pellets or small lumps or particles which though they are hard and compact enough so that they will not be reduced to a powder by the pressure and attrition incident to transportation and subsequent handling in the brewery, contains appreciably no gelatinized starch. I say appreciably no gelatinized starch, because all commercial starch may contain, owing to unavoidable imperfections in the process of manufacture, a trace of gelatinization just as it may contain other impurities such, for example, as small quantities of oil. The agglomeration of the raw starch granules in the pellets or lumps is not effected by gelatinization but by the use of a binder, the process being carried out in such manner that gelatinization will not take place.

The drawings annexed hereto show a preferred form of apparatus for carrying out the process of my invention. It will be understood, however, that this apparatus is only to be taken as illustrative. The process might be carried out by apparatus very different in its construction from that shown.

In the drawings Figure 1 is a plan view of the apparatus. Fig. 2 is a cross sectional view on line 2—2 of Fig. 1. Fig. 3 is a longitudinal sectional view on line 3—3 of Fig. 1; and Fig. 4 is a cross section on line 4—4 of Fig. 3.

Like characters of reference designate like parts in the several figures of the drawings.

In carrying out my process the raw starch is mixed with a liquid or semi-liquid adhesive binder, and is then formed into comparatively small particles which are dried under conditions that prevent the gelatinization of the starch. The binder is preferably a substance derived from starch by conversion or partial conversion, the term "conversion" hereinafter used in the specification and claims being intended to cover a partial conversion as well as complete conversion. I may use, for this purpose, ordinary glucose but preferably employ the partial conversion product known as mazam (patented to Theodore B. Wagner, June 4, 1907, No. 855,599) dissolved in water, preferably the mazam liquor as it comes from the converter. For example, I preferably mix together commercially dry starch (ten to fifteen per cent. moisture) with mazam liquor at a density of twenty degrees Baumé, in the proportion of three-fourths, by volume, of starch to one-fourth of the liquid. This will raise the moisture percentage of the starch to about thirty. If glucose is used as a binder the percentage of moisture need not be as great because of the greater adhesiveness of the glucose. In carrying out the process with glucose I preferably mix together four parts, by volume, of commercially dry starch with one part glucose at thirty-five per cent. Baumé. The percentage of moisture in the mixture will be about twenty-five. These proportions may be varied and other conversion products used besides glucose or mazam.

In the drawings, 10 is a conveyer for the dry starch discharging through spout 11 into a starch bin 12 in which there is a measuring cup 13 mounted on a revoluble shaft 14. The cup delivers the starch in measured quantities into a conveyer and mixer 15.

16 is a supply vessel for the binder, for example, for the mazam liquor which is delivered into the conveyer 15 by a cup 17 arranged on the shaft 14 to which the starch measuring cup is attached. The mazam is thoroughly mixed with the starch by the flight of conveyer 15 and the material thus mixed is then delivered into a mill consisting of a cylindrical screen 18 preferably rotated in one direction and beaters 19 on a shaft 20 within the screen which are rotated in the opposite direction. The moist starch is forced through the mesh of the screen in relatively small particles and falls into a conveyer 21 which delivers it into rotary drier 22 supported in slightly inclined position on rollers 23 and rotated by suitable driving mechanism 24. The drier is preferably of the indirect type, in order to prevent the possibility of gelatinization; although this result might be obtained with different types of driers if handled with proper care. Air enters through the lower end of the drier after having been first heated by contact with a steam coil 25 or other suitable heating means. The air is withdrawn at the other end of the drier preferably by means of a suction fan 26. The material moves by gravity in the direction opposite to the direction of air current, is discharged into a hopper 27 through openings 28 in the drier. The interior of the drier is preferably provided with longitudinally extending ledges or shelves 29 which keep the material in constant movement.

By means of the apparatus above described the comminuted moist starch is dried without being gelatinized. The vapors are drawn off by the forced draft through the drier as soon as they are formed. By doing this the starch may be subjected to enough heat to dry it quite rapidly without danger of producing even a partial gelatinization. In this connection it is also important that the starch should not contain too much moisture. Wet starch will paste or gelatinize much more readily, at the same temperatures, than starch containing less moisture.

The product consists of pellets or small lumps or particles of starch which may be as dry as the ordinary pearl starch and are hard enough so that they will not break up or powder to any appreciable extent when shipped or otherwise handled. The particles are substantially uniform in character throughout, that is, there is no appreciable crust or superficial shell or envelop which would tend to prevent the material from breaking down readily and completely. When placed in water the binder dissolves, freeing the starch granules, so that a starch milk is readily formed which leaves no sediment or residue when the wort is withdrawn from the mash other than such possible trace of impurities as might be found in any starch manufactured under commercial conditions.

By use of the term "pellets" I intend to convey the idea that the material is in such form that it will flow in much the same way that grain, or granular substances generally, will flow when poured.

I do not mean that the starch bodies are necessarily spherical in form. As a matter of fact, in the process of manufacture as hereinabove described the product will be in the form of small bodies which, though generally rounded, like small gravel stones, are quite irregular and differ considerably among themselves, both in shape and size.

I claim:

1. A starch product in the form of pellets composed of starch and mazam which acts as a binder to hold the starch granules together.

2. A substantially dust free starch product composed of starch and mazam in the form of compact relatively hard bodies which break down in water at usual mashing temperatures to form starch milk leaving no residue.

3. The method of producing starch in the form of pellets which consists in mixing starch with a liquid binder, comminuting the mixed material, and drying said material under conditions which prevent any appreciable amount of gelatinization.

4. The method of producing starch in the form of pellets which consists in mixing starch with a liquid binder, comminuting the mixed material and subjecting the same to a drying operation in which the vapors are withdrawn as formed.

5. The method of producing starch in the form of pellets which consists in mixing starch with a liquid binder, comminuting the mixed material and passing said material through a drier through which a draft of air is maintained in the direction opposite to the movement of the material.

6. The method of producing starch in the form of pellets which consists in mixing starch with a liquid binder, comminuting the mixed material and subjecting the same, while in constant movement and agitation, to a draft of hot air which evaporates and carries off the moisture.

7. The method of producing starch in the form of pellets which consists in mixing starch with an adhesive liquid derived from starch by conversion, comminuting the mixed material and drying the same under conditions which prevent an appreciable amount of gelatinization.

8. The method of producing starch in the form of pellets which consists in mixing starch with mazam liquor, comminuting the mixed material and drying the same under conditions which prevent an appreciable amount of gelatinization.

9. The method of producing starch in the form of pellets which consists in mixing starch, a conversion product of starch and sufficient water to make the moisture content from twenty-five to thirty per cent., by weight, of the whole, comminuting the mixed material and drying the same under conditions which prevent an appreciable amount of gelatinization.

10. The method of producing starch in the form of pellets which consists in mixing starch, a conversion product of starch and sufficient water to make the moisture content from twenty-five to thirty per cent., by weight, of the whole; comminuting the mixed material and subjecting the same to a drying operation in which the vapors are withdrawn from contact with the material as formed.

11. The method of producing starch in the form of pellets which consists in mixing starch and mazam liquor at such density that the moisture content of the mixture is approximately thirty per cent. of the whole, by weight, comminuting the mixed material, and drying the same under conditions which prevent any appreciable amount of gelatinization.

12. The method of producing starch in the form of pellets which consists in mixing dry starch with mazam liquor at approximately twenty degrees Baumé in the proportion of three-fourths starch to one-fourth liquor by volume; comminuting the mixed material and drying the same under conditions which prevent any appreciable amount of gelatinization.

LOUIS P. BAUER.

Witnesses:
L. A. FALKENBERG,
G. Y. SKINNER.